United States Patent [19]
Nakano et al.

[11] Patent Number: 5,139,349
[45] Date of Patent: Aug. 18, 1992

[54] BEARING DEVICE FOR HORIZONTAL SHAFT TYPE ROTATING MACHINE

[75] Inventors: Masaaki Nakano, Hitachi; Kazuhiko Kawaike, Katsuta; Eiichi Okuyama; Kenzo Kajiwara, both of Hitachi, all of Japan

[73] Assignee: Hitachi, Ltd., Tokyo, Japan

[21] Appl. No.: 771,107

[22] Filed: Oct. 4, 1991

[30] Foreign Application Priority Data

Oct. 4, 1990 [JP] Japan .................. 2-265149

[51] Int. Cl.⁵ .................. F16C 33/66; F16C 33/10
[52] U.S. Cl. ............................ 384/322; 384/404
[58] Field of Search .............. 384/322, 397–407, 384/414, 462, 465, 467, 473, 313, 315, 317, 446; 184/6.24, 6.25, 6.21

[56] References Cited

U.S. PATENT DOCUMENTS

| | | | |
|---|---|---|---|
| 2,080,101 | 5/1937 | Trumpler | 384/313 |
| 2,606,796 | 8/1952 | Helms | 384/404 X |
| 3,098,683 | 7/1963 | Jernberg | 384/313 |
| 3,857,462 | 12/1974 | Kaufman et al. | 384/404 X |
| 4,327,950 | 5/1982 | Czuscak | 384/404 |
| 4,448,552 | 5/1984 | White et al. | 384/404 |
| 4,964,740 | 10/1990 | Nakano et al. | 384/313 |

FOREIGN PATENT DOCUMENTS

961584 3/1957 Fed. Rep. of Germany.

Primary Examiner—Thomas R. Hannon
Attorney, Agent, or Firm—Antonelli, Terry Stout & Kraus

[57] ABSTRACT

A bearing device for a horizontal shaft type rotating machine includes an oil tank formed at the lower portion of the bearing box for storing lubricant oil for the bearing, the oil tank being divided by a bearing support plate between an oil feeding chamber and an oil collecting chamber; an oil feeding apparatus which pumps up the lubricant oil in the oil feeding chamber and feeds the lubricant oil onto the bearing; and a pair of diffusion flow passages; each of the pair of diffusion flow passages being formed along the inner wall of the oil tank and connects the oil collecting chamber with the oil feeding chamber; each of the diffusion flow passages permitting diffusion and movement of the lubricant oil from the oil collecting chamber to the oil feeding chamber. Each of the diffusion flow passages including a baffle chamber and a narrow gap flow passage downstream of the baffle chamber and having a smaller cross section flow passage area than the baffle chamber and the upper portion of the baffle chamber being open to the air, whereby air bubbles contained in the collected high temperature lubricant oil are removed at an early stage of their return travel from the oil collecting chamber to the oil feeding chamber.

8 Claims, 3 Drawing Sheets

BEARING DEVICE FOR HORIZONTAL SHAFT TYPE ROTATING MACHINE

BACKGROUND OF THE INVENTION

The present invention relates to a bearing device for a horizontal shaft type rotating machine and, in particular, relates to a bearing device which feeds lubricant oil to a sliding bearing which supports a rotating shaft.

In a conventional self oil feeding type sliding bearing device which is applied to a horizontal shaft type rotating machine such as a horizontal shaft type electric motor, the lubricant oil was pumped up by making use of the rotating shaft and was fed on to the lubricating surface of the bearing and wherein ordinarily an oil ring or viscosity pump was disposed inside or near the bearing device and the lubricant oil was pumped up from an oil tank located at a lower part of the bearing device. In such instance, the lubricant oil which was fed to the bearing portion and had contributed to the lubrication of the bearing lubricating surface was heated due to shearing frictional action caused by the bearing surface and the heated lubricant oil dropped off from the both ends of the bearing and returned to the oil tank.

As indicated above, the lubricant oil which dropped off from the both ends of the bearing had been heated, it was necessary to reduce the temperature of the lubricant oil as much as possible by cooling in order to reuse the heated lubricant oil for circulation. However, the lubricant oil which has been used for lubrication is mostly mixed with air, and the lubricant oil in the oil tank which has been discharged from the bearing generates air bubbles and gradually clouds the oil into a milky color. When cooling such milky clouded and heated lubricant oil via heat radiation to the outside, the heat radiation efficiency is very low, because of the extreme reduction in the heat conductivity of the lubricant oil due to the air bubble inclusion therein. Further, when the lubricant oil of high temperature yet containing the air bubbles is directly fed onto the bearing lubricating surface, the cooling and lubricating effect of the lubricant oil for the bearing is lowered.

One of the countermeasures to the above problem is disclosed in German Patent No. 961584 in which the rotating shaft is supported by the bearing in the bearing box which stores lubricant oil in the bottom thereof, an oil ring is disposed inside the bearing box and the lubricant oil is pumped up and fed on to the bearing lubricating surface, and further in such construction the oil tank which is located at the bottom portion of the bearing box and stores the lubricant oil is divided into a plurality of oil chambers, and as well the respective oil chambers are communicated via respective communicating tubes provided at the respective bottoms of the oil chambers, further, air is ventilated via the space between the respective oil chambers to cool the lubricant oil therein.

In the above bearing device, the lubricant oil discharged from the both ends of the bearing is collected into the outer oil chambers which is plurarity of the oil chambers formed by dividing the oil tank, and the lubricant oil is moved downward in the respective oil chambers and thereafter is returned to an oil chamber wherein the oil ring disposed via the communicating tubes provided at the bottom of the respective oil chambers. Further, the lubricant oil is cooled by ventilating air passing via the space formed between the respective oil chambers.

In the conventional bearing device discussed above, the air mixing into the lubricant oil can not be avoided because the lubricant oil contacts with air during discharge thereof from the bearing lubricating surface and collection thereof into the oil tank, therefore the lubricant oil which has been discharged from the bearing lubricating surface and collected in the oil tank is heated to a high temperature, and possibly the oil is clouded into a milky color due to generation of air bubbles therein. However, there are no specific measures for removing the air bubbles mixed into the lubricant oil such that the lubricant oil is insufficiently cooled by natural heat radiation via the outer walls of the oil tank which results in unsatisfactory lubrication of the bearing.

SUMMARY OF THE INVENTION

The present invention solves the above problems, and an object of the present invention is to provide a bearing device for a horizontal shaft type rotating machine with high reliability which improves heat radiation efficiency via the outer walls of the oil tank by removing the air bubbles from the lubricant oil and enables the resultant lubricant oil to be fed free from the air bubbles and at a low temperature onto the bearing surface.

A bearing device for a horizontal shaft type rotating machine according to the present invention comprises a bearing supporting a rotating shaft for the horizontal shaft type rotating machine, a bearing box inside of which a bearing support plate supporting the bearing is disposed, an oil tank located at the lower part of the bearing box and storing lubricant oil, an oil feeding arrangement which pumps up the lubricant oil in the oil tank and feeds the lubricant oil onto the bearing, and a circulation passage which returns the lubricant oil discharged from the bearing into the oil tank, wherein the oil tank is divided into an oil feeding chamber wherein an inlet of a lubricant oil suction tube in the oil feeding arrangement is disposed and an oil collecting chamber wherein outlets of discharge oil introducing apertures for collecting the lubricant oil discharged from the bearing are disposed, and the inner circumferential wall face of the oil tank is provided with a diffusion flow passage through which the lubricant oil from the oil collecting chamber into the oil feeding chamber is moved while permitting diffusion thereof along the inner circumferential wall surface of the oil tank.

Further, the diffusion flow passage is formed by a plurarity of oil guide members which are arranged along the inner wall of the oil tank into its circumferential direction.

Still further, the oil feeding chamber and the oil collecting chamber are provided with a pair of partition plates with a slit, and the respective partition plates constitute a portion of wall of the respective oil feeding chamber and oil collecting chamber and further the respective cross sectional areas of flow passages formed by the slits in the partition plates are smaller than the diffussion flow passage.

Still further, the diffusion flow passage is formed of a first diffusion flow passage and a second diffusion flow passage which follows the first diffusion flow passage and has a flow passage cross sectional area smaller than the first diffusion flow passage. The upper portion of the first diffusion flow passage is opened to the air.

Still further, a communication flow passage is provided between the oil collecting chamber and the oil feeding chamber through which a portion of the lubricant oil in the oil collecting chamber moves directly into the oil feeding chamber bypassing the diffusion flow passage when the lubricant oil level in the oil collecting chamber exceeds a predetermined oil level.

Still further, a permanent magnetic member is provided at least in a portion of the diffusion flow passage through which the lubricant oil is moved from the oil collecting chamber to the oil feeding chamber.

Still further, the oil collecting chamber of the bearing device is placed near an end bracket of an electrical rotating machine when the bearing device is assembled into the electrical rotating machine.

According to the present invention, the oil tank is divided into the oil collecting chamber and the oil feeding chamber, and discharge oil introducing apertures are formed in the bearing for collecting the lubricant oil discharged from the bearing into the oil collecting chamber, such that the lubricant oil discharged from the bearing flows into the oil collecting chamber. Further, a pair of diffusion flow passages are formed along the inner wall of the oil tank by disposing oil guide members therealong such that the lubricant oil collected into the oil collecting chamber flows into the oil feeding chamber via a pair of the diffusion flow passages, accordingly the lubricant oil which has been discharged from the bearing is once collected into the oil collecting chamber, and such collected lubricant oil is prevented from being immediately mixed with the lubricant oil in the oil feeding chamber which is to be fed to the bearing.

Further, a pair of annular oil grooves are formed at both ends of the bearing along the inner circumferential surface thereof and further the discharge oil introducing apertures connecting the oil grooves to the oil collecting chamber are provided in the bearing thereby the lubricant oil discharged from the bearing is efficiently flows into the oil collecting chamber.

Now, in the diffusion flow passages, there is formed a narrow gap flow passage by incorporating the oil guide members provided with a slit, air bubbles with larger diameters which are mixed in the lubricant oil disappear at the inlet of the narrow gap flow passage. Further, in the diffusion flow passage, a baffle chamber is provided downstream the narrow flow passage, the flow passage cross sectional area of the baffle chamber is expanded from that of the narrow gap flow passage and the upper portion of the baffle chamber is opened in the air, thereby air bubbles having smaller diameters contained in the lubricant oil rise up to the oil surface facing the air and disappear. Thereafter, the lubricant oil free from the air bubbles flows into the oil feeding chamber via the additional diffusion flow passage while radiating the heat thereof. The above baffle chamber is formed by the inner wall of the oil tank and an oil cover, and the oil cover is detachably attached such that impurities in the lubricant oil deposited in the baffle chamber are easily removed.

Further, a permanent magnetic material is used for a portion of the oil guide members to remove magnetic particles contained in the lubricant oil by an attraction force of the parmanent magnetic material.

Still further, the communicating flow passages are provided at the upper portions on the both ends of the bearing support plate, the collected lubricant oil overflowing the oil collecting chamber flows out from the oil collecting chamber to the oil feeding chamber via the communicating flow passage before the overflowing lubricant oil leaks out from the seal portion of the bearing to thereby prevent the leakage of the lubricant oil to the outside.

Still further, when assembling the bearing device according to the present invention with an electric motor the oil collecting chamber thereof is located near the end bracket of the electric motor thereby heat of the high temperature lubricant oil collected in the oil collecting chamber is effectively radiated toward the electric motor end bracket which is cooled by the cooling air flowing in the electric motor.

With the bearing device according to the present invention, the air bubbles mixed in the high temperature lubricant oil which has been discharged from the bearing are removed from the lubricant oil at an early stage of their travel via the diffusion flow passage including the baffle chamber formed along the inner wall of the oil tank and the high temperature lubricant oil which is free from the air bubbles is further moved via the diffusion flow passage to realize effective cooling of the lubricant oil. Further, foreign materials contained in the lubricant oil are effectively removed, thereby cooled lubricant oil which is free from air bubbles and foreign materials can be fed onto the bearing lubricating surface via the oil feeding apparatus so that reliability of the bearing device is enhanced. Still further, the bearing device is disposed so that the oil collecting chamber thereof is located near the end bracket of the electric motor, heat radiation of the high temperature lubricant oil collected in the oil collecting chamber is effectively achieved.

DETAILED EXPLANATION OF THE EMBODIMENT

Hereinblow, one embodiment of the present invention is explained with reference to FIG. 1 through FIG. 6.

Figure 1:
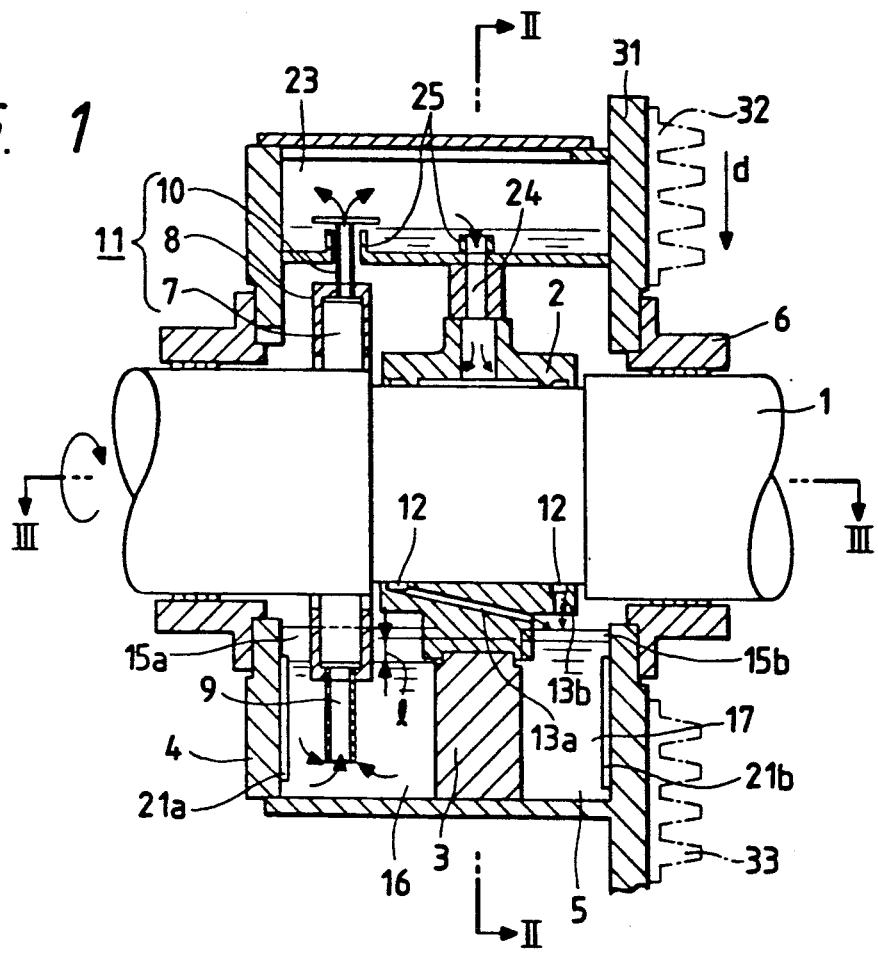
FIG. 1 is a cross section of one embodiment of the bearing device for a horizontal shaft type rotating machine according to the present invention.
Figure 2:
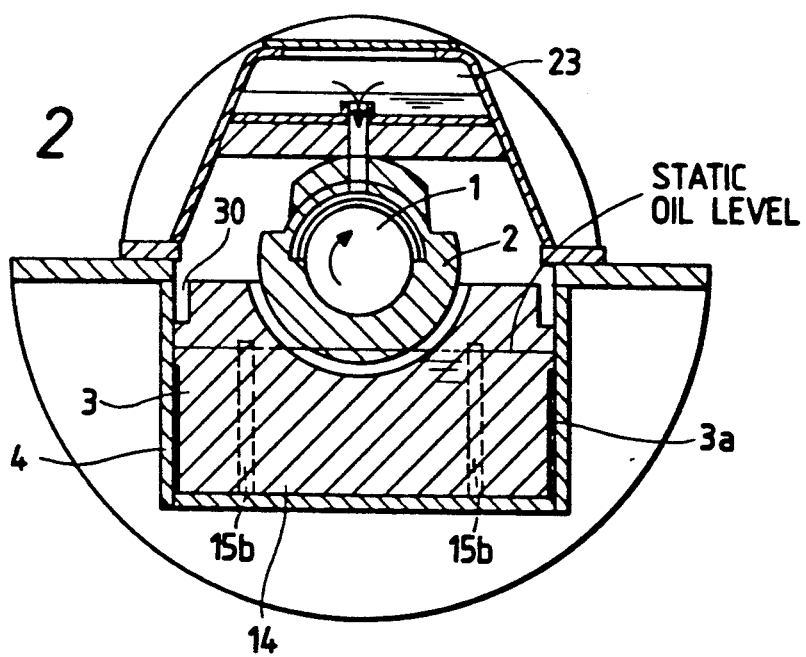
FIG. 2 is a cross section taken along the line II—II in FIG. 1.

As illustrated in FIG. 1 and FIG. 2, a rotating shaft 1 of a horizontal shaft type rotating machine is supported by a sliding bearing 2 includes upper and lower halves, this sliding bearing 2 is supported by a bearing support plate 3 which is disposed within a bearing box 4.

Further as illustrated in FIG. 1, at the both right and left sides of the bearing box 4, labyrinth type seals 6 are provided so as to prevent leakage of lubricant oil 5. The lubricant oil feeding onto the bearing 2 is carried out by a viscosity pump 11 which includes an oil disk secured to the rotating shaft 1, a pump casing 8 freely held around the outer circumference thereof via an oil film, and a suction tube 9 and discharge tube 10 are both secured to the pump casing 8. Further, on the inner circumferential face of the bearing 2 and near its both end portions a pair of oil grooves are formed. Discharge oil introducing aperture 13a which inclines in the axial direction of the bearing 2 communicates with the oil groove 12 being remote from an oil collecting chamber 17 and communicates with the oil collecting chamber 17, and oil introducing aperture 13b which runs straight down communicates with the oil groove 12 near the oil collecting chamber 17 and communicates with the oil collecting chamber 17. Both aperture 13a and aperture 13b are formed in the bearing 2.

Figure 3:
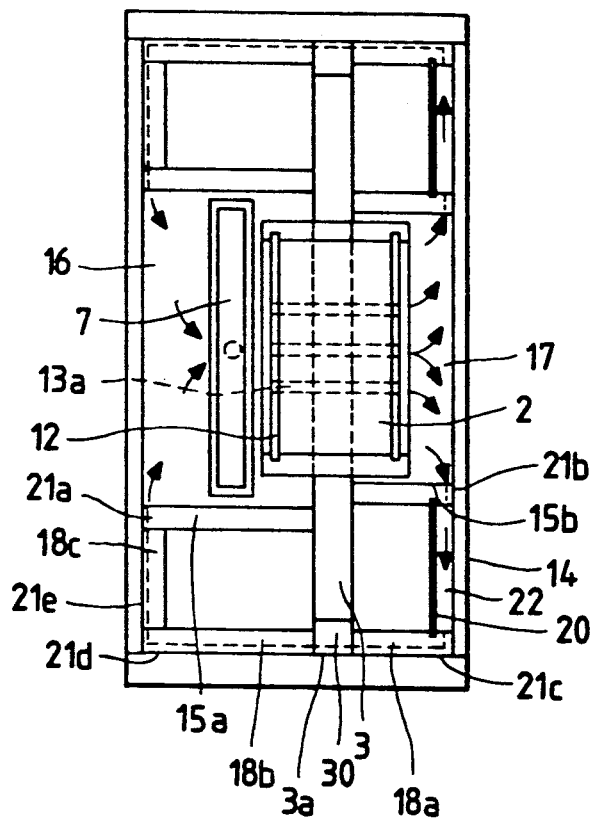
FIG. 3 is a plane view taken along the line III—III in FIG. 1 wherein the rotating shaft is removed.
Figure 4:
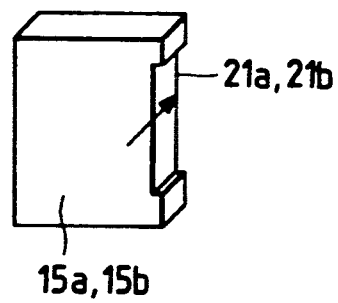
FIG. 4 is a perspective view of a partition plate used in the embodiment in FIG. 1.
Figure 5:
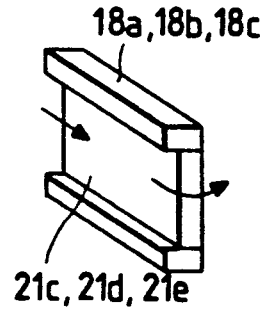
FIG. 5 is a perspective view of an oil guide member used in the embodiment in FIG. 1.
Figure 6:
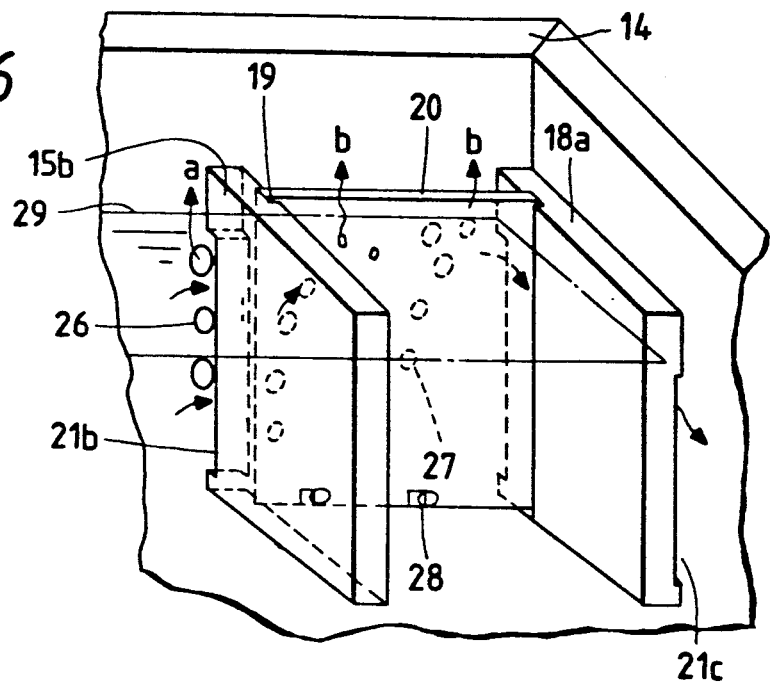
FIG. 6 is a perspective view showing a major part in FIG. 3.

As illustrated in FIG. 2, the lower half portion of the bearing box 4 is an oil tank 14 which accommodates the lubricant oil 5 (see FIG. 1) therein, the static oil level is always higher than the lower most portion of the oil disk 7 (see FIG. 1). The oil tank 14 is divided and separated by the bearing support plate 3 with slits 3a at the both ends thereof. The details of the respective chambers thus divided and separated are explained with reference to FIG. 3. In the respective chambers, a pair of partition plates 15a and 15b oppose each other, and with these partition plates 15a and 15b, the bearing support plate 3 and the inner wall of the oil tank 14, an oil feeding chamber 16 and the oil collecting chamber 17 are constructed. The partition plates 15a and 15b are respectively provided with slits 21a and 21b as shown in FIG. 4. Oil guide members 18a, 18b and 18c, each having a slit 21c, 21d and 21e as illustrated in FIG. 5 are arranged and secured along the inner wall of the oil tank 14 with the slitted portions thereof facing to the inner wall of the oil tank 14, thereby a pair of diffusion flow passages of a narrow gap are formed between the respective oil guide members 18a, 18b and 18c and the inner wall of the oil tank 14. FIG. 6 illustrates a major portion of FIG. 3 in a perspective view. The partition plate 15b and oil guide member 18a include a groove 19, and an oil cover 20 is detachably fitted through the grooves 19 thereby to form a baffle chamber 22 (see FIG. 3) through the diffusion flow passage of a narrow gap and the baffle chamber 22, the oil collecting chamber 17 and the oil feeding chamber 16 communicate. Namely, the oil collecting chamber 17 which collects the lubricant oil discharged from the bearing 2 and the oil feeding chamber 16 in which the suction tube 9 of the viscosity pump 11 is disposed are communicated via the diffusion flow passage constituted by the respective narrow gap flow passages and the baffle chamber 22 formed along the inner wall of the oil tank 14.

On the other hand, at the upper portion of the bearing box 4, an intermediate tank 23 (see FIG. 1 and FIG. 2) is provided for storing the lubricant oil. Oil dams 25 for the discharge tube 10 of the viscosity pump 11 and feeding an oil feeding port 24 for the bearing 2 are formed in the intermediate tank extending from the bottom thereof. The discharge tube 10 connected to the pump case 8 extends into the intermediate tank 23 via one of the oil dams 25 with a gap therebetween, and the oil feeding port 24 communicates with the inner circumferential face of the bearing 2.

Further, as illustrated in FIG. 2, at the upper right and left portions of the bearing support plate 3, dams 30 are formed. The height of the dams 30 is lower than the lower end portions of the labyrinth seals 6 (see FIG. 2) and higher than the static oil level.

In the above explained construction, when the rotating shaft is rotated, the oil disk 7 which is integrated with the rotating shaft 1 rotates therewith, and the lubricant oil having a high viscosity sticks to the rotating oil disk 7, and this viscosity friction generates a pumping action. With this pumping action the lubricant oil moves toward the outside via the narrow gap passage formed between the inner circumferential face of the pump case 8 and the outer circumferential face of the oil disk 7 and flows into the intermediate tank 23 after passing through the discharge tube 10, then the lubricate oil mixes with the lubricant oil stored in the intermediate tank 23. Thereafter a portion of the lubricant oil which overflows from the oil dam 25 is fed onto the bearing 2 via the oil feeding port 24 to lubricate and cool the lubricating surface of the bearing 2. The lubricant oil fed onto the bearing 2 is again collected into a pair of the oil grooves 12 and, subsequently, led to the oil collecting chamber 17 via the respective oil introducing apertures 13a and 13b. The collected lubricant oil has been heated to a high temperature due to shearing frictional action during lubrication thereof. Further, the lubricant oil discharged from the bearing 2 contacts with air which is mixed into the lubricant oil such that air bubbles are generated in the lubricant oil collected into the oil collecting chamber 17 to cloud the lubricant oil into a milky color. The milky clouded high temperature lubricant oil is stored in the oil collecting chamber 17 defined by the partition plate 15b, the bearing support plate 3 and the inner wall of the oil tank 14 as illustrated in FIG. 3. Since this oil collecting chamber 17 is separated from the oil feeding chamber 16 in which the viscosity pump 11 is disposed, the lubricant oil in the oil collecting chamber 17 never directly reaches to the suction tube 9. However the milky clouded high temperature lubricant oil never remains for very long in the oil collecting chamber 17 because of the suction force induced by the pumping action of the viscosity pump 11.

The movement of the lubricant oil within the oil tank 14 is illustrated shown by arrows in FIG. 3. The heated lubricant oil discharged from the discharge oil introducing apertures 13a and 13b and collected into the oil collecting chamber 17 is first led to the narrow gap formed between the slit 21b provided at one side of the partition plate 15b and the inner wall of the oil tank 14. As shown in FIG. 6, this narrow gap is located below oil level 29 and is set to be extremely narrow, the passing of air bubbles 26 having larger diameter than the narrow gap is prevented, and the air bubbles 26 rise up as shown by an arrow a and disappear. On the other hand, air bubbles 27 having smaller diameters pass through the narrow gap of the slit 21b and proceed into the baffle chamber 22 (see FIG. 3). The cross section of the flow passage in the baffle chamber 22 is is larger than that of the narrow gap flow passage constituted with the above slit 21b; and additionally the upper portion of the baffle chamber 22 is opened to the air. For these reasons, the flow rate of the lubricant oil in the baffle chamber 22 is low, and the lubricant oil therein flows parallel along the inner wall of the oil tank 14, therefore the air bubbles 27 having smaller diameters mixed into the lubricant oil rise up as shown by arrows b while moving with the lubricant oil and mix with the air and disappear. Further, with respect to foreign materials mixed into the lubricant oil and carried therewith, comparatively light foreign materials are caught at the inlet of the oil guide member 18a and comparatively heavy foreign materials 28 such as abraded particles precipitate upon the bottom of the baffle chamber 22 and are prevented from flowing into the narrow gap flow passage defined by the slit 21c. Since the oil cover 20, which is one of the elements of the baffle chamber 22, is easily detached, foreign materials precipitated therein can be removed anytime. The lubricant oil from which the air bubbles and the foreign materials have been thus removed passes through the diffusion flow passage formed by the narrow gaps of the respective slits 21c, 21d and 21e of the oil guide members 18a, 18b and 18c and flows into the oil feeding chamber 16 via the slit 21a of the partition plate 15a. Further, in this instance, the oil guide members 18a, 18b and 18c can be made of a permanent magnetic material to attract magnetic particles thereto contained in the lubricant oil and to prevent entry of the magnetic particles into the oil feeding chamber 16.

In the above embodiment of the bearing device for a horizontal shaft type rotating machine according to the present invention, air bubbles which are contained in the lubricant oil and which impede effective cooling of the heated lubricant oil are at first removed and dissipated, and thereafter the heated lubricant oil free from the air bubbles is circulated along the inner wall of the oil tank 14 so as to effectively exchange heat with the cool outer air, thereby the heat radiation efficiency of the lubricant oil exchanged through the outer wall of the oil tank 14 is significantly improved. Accordingly, cooled lubricant oil free from air bubbles is fed onto the lubricating surface of the bearing 2 thereby the lubricating performance of the bearing device and as well reliability thereof is enhanced.

Figure 7:
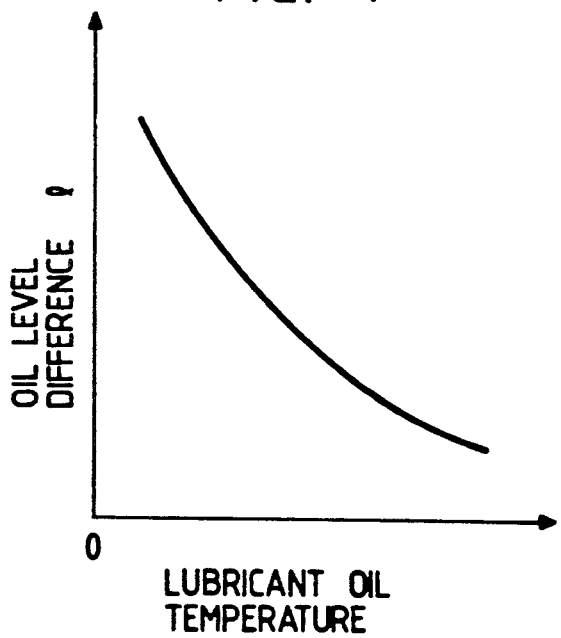
FIG. 7 is a graph showing a relationship between lubricant oil temperature and oil level difference in the embodiment in FIG. 1.

Further, when the lubricant oil flows from the oil collecting chamber 17 to the oil feeding chamber 16 via the diffusion flow passage including the baffle chamber 22, an level difference l is induced between the oil levels of the both chambers due to the head difference thereof as illustrated in FIG. 1. When the oil level difference increases, the lubricant oil in the oil collecting chamber 17 may leak outside via the labyrinth seals 6. FIG. 7 illustrates a relationship between lubricant oil temperature and oil level difference, FIG. 7 illustrates that the lower is the lubricant oil temperature, the larger is the oil level difference. For this reason, during the starting period of the bearing device wherein the temperature of the lubricant oil is low and the viscosity thereof is high, the oil level of the lubricant oil in the oil collecting chamber 17 rises. However, by the provision of the dams 30 formed upper right and left portions of the bearing support plate 3, the lubricant oil overflows the dams 30 and flows into the oil feeding chamber 16 before the oil level of the lubricant oil reaches that of the labyrinth seals 6, and the oil levels of the lubricant oil in the both chambers balance and stablize with respect to the height of the dams 30, thereby lubricant oil leakage through the labyrinth seals 6 is prevented.

Further, in an electric motor, an end bracket 31 of the electric motor is disposed and secured at the end of a stator frame (not show) of the electric motor, and external cool air is suctioned in by a fan (not shown) for cooling motor windings from the upper portion of the end bracket 31 as shown by an arrow d, thus the inner surface of the end bracket includes a member cooled by the cooling wind, accordingly by assembling the bearing device of the present embodiment so as to locate the oil collecting chamber 17 next to the end bracket 31, the heat of the high temperature lubricant oil collected in the oil collecting chamber 17 is effectively radiated through the end bracket 31, which contributes to reproduce a reliable lubricant oil for the bearing device.

Figure 8:
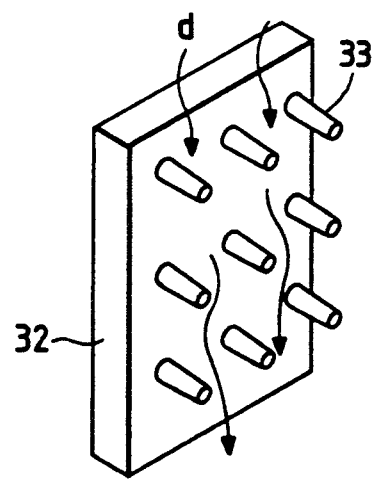
FIG. 8 is a perspective view of a cooling plate with pin shaped cooling fins which may be incorporated in the embodiment in FIG. 1

Still further, since the cooling wind flow direction in the electric motor is a scattering flow such that when a cooling body 32 having a multiplicity of pin shaped cooling fins 33 as illustrated in FIG. 8 is closely secured on the cooling wind passing surface of the end bracket 31 as illustrated in FIG. 1, cooling performance of the present bearing device due to the lubricant oil is further improved.

We claim:
1. A bearing device for a horizontal shaft type rotating machine comprising:
   a bearing which supports a rotating shaft of the horizontal shaft type rotating machine;
   a bearing support plate for supporting said bearing;
   a bearing box for accommodating said bearing support plate;
   an oil tank formed at a lower portion of said bearing box for storing lubricant oil for said bearing, said oil tank being divided by said bearing support plate into an oil feeding chamber and an oil collecting chamber;
   an oil feeding apparatus for pumping the lubricant oil in said oil feeding chamber and feeding said lubricant oil to said bearing, said oil collecting chamber collecting discharged lubricant oil from said bearing; and
   a pair of diffusion flow passages, each of the diffusion flow passages formed along the inner wall of said oil tank and communicating said oil collecting chamber with said oil feeding chamber, each of said diffusion flow passages permitting movement and diffusion of the discharged lubricant oil from said oil collecting chamber to said oil feeding chamber.

2. A bearing device for a horizontal shaft type rotating machine according to claim 1, wherein each of said pair of diffusion flow passages includes a first diffusion flow passage and a second diffusion flow passage downstream of said first diffusion flow passage and having a smaller cross sectional area than that of said first diffusion flow passage, and an upper portion of said first diffusion flow passage being opened to the air.

3. A bearing device for a horizontal shaft type rotating machine according to claim 2, wherein said first diffusion flow passage includes a restricted inlet and outlet flow passage, and the cross sectional area of said resricted inlet and outlet flow passage being smaller than that of said second diffusion flow passage.

4. A bearing device for a horizontal shaft type rotating machine according to claim 2, wherein a portion of said each of said pair of diffusion flow passages is fashioned of a permanent magnetic material.

5. A bearing device for a horizontal shaft type rotating machine according to claim 1, wherein each of said pair of diffusion flow passages is respectively provided with a restricted inlet and outlet flow passage.

6. A bearing device for a horizontal shaft type rotating machine according to claim 1, further comprising a communicating flow passage between said oil collecting chamber and said oil feeding chamber which bypasses said first and second diffusion flow passages and transfers a portion of the lubricant oil in said oil collecting chamber directly into said oil feeding chamber when an oil level of the lubricant oil in said oil collecting chamber exceeds a predetermined oil level.

7. A bearing device for a horizontal shaft type rotating machine according to claim 1, wherein a portion of each of said pair of diffusion flow passages is fashioned of a permanent magnetic material.

8. A bearing device for a horizontal shaft type rotating machine according to claim 1, wherein said oil collecting chamber is located near an end bracket of an electrical motor, when the bearing device is assembled with the electric motor.

* * * * *